US010915610B2

(12) United States Patent
Jadhav et al.

(10) Patent No.: US 10,915,610 B2
(45) Date of Patent: Feb. 9, 2021

(54) SYSTEMS AND METHODS FOR INCLUSIVE CAPTCHA (71) Applicant: Tata Consultancy Services Limited, Mumbai (IN)

(72) Inventors: Charudatta Jadhav, Mumbai (IN); Sumeet Agrawal, Mumbai (IN); Madhu Priyatam Venkata Paladugu, Mumbai (IN)

(73) Assignee: Tata Consultancy Services Limited, Mumbai (IN)

( * ) Notice: Subject to any disclaimer, the term of this patent is extended or adjusted under 35 U.S.C. 154(b) by 300 days.

(21) Appl. No.: 15/922,632

(22) Filed: Mar. 15, 2018

(65) Prior Publication Data
US 2019/0018937 A1    Jan. 17, 2019

(30) Foreign Application Priority Data

Jul. 17, 2017   (IN) .............................. 201721025362

(51) Int. Cl.
*G06F 21/31* (2013.01)
*G06F 21/36* (2013.01)
(Continued)

(52) U.S. Cl.
CPC .............. *G06F 21/31* (2013.01); *G06F 21/36* (2013.01); *G06N 20/00* (2019.01); *G09B 21/006* (2013.01);
(Continued)

(58) Field of Classification Search
CPC .. G06F 21/31; G06F 21/36; G06F 2221/2103; G06F 2221/2133; G06N 20/00; G09B 21/006
(Continued)

(56) References Cited

U.S. PATENT DOCUMENTS 7,890,857 B1 * 2/2011 Jouppi ................... G06Q 30/02
                                                    715/243
8,036,902 B1 * 10/2011 Strom ..................... G06F 21/31
                                                    704/275
(Continued)

FOREIGN PATENT DOCUMENTS

EP   2410450 A1 *  1/2012 ............. G06F 21/31
EP   3432182 A1 *  1/2019 ........... G09B 21/006
(Continued)

OTHER PUBLICATIONS

Saric, "The Accessibility Demand for Audio Captcha", https://captcha.com'articles/audio-captcha.html, 8 pages, Aug. 2013. (Year: 2013).*

(Continued)

*Primary Examiner* — Luu T Pham
*Assistant Examiner* — Walter J Malinowski
(74) *Attorney, Agent, or Firm* — Finnegan, Henderson, Farabow, Garrett & Dunner, LLP (57) ABSTRACT

The present disclosure relates to systems and methods for providing inclusive CAPTCHA. The method, in response to a user request for a webpage having CAPTCHA, creates a media file in real-time, wherein the created media file is characterized by distortion interference and corresponds to a selected theme from a plurality of themes associated with real-world scenarios. Further, randomly selecting a comprehension question from a plurality of comprehension questions for the created media file as the CAPTCHA, the comprehension question being based on the selected theme, geography associated with a user requesting the webpage and context of the created media file and transmits the webpage including the CAPTCHA. Further, in response to a user input to the comprehension question, intelligently detecting either a human input or a machine input based on a self-learning CAPTCHA decision module, by considering (Continued)

one or more of spelling errors, incomplete responses, contextual metonyms, synonyms and variants thereof.

13 Claims, 9 Drawing Sheets

(51) Int. Cl.
*G06N 20/00* (2019.01)
*G09B 21/00* (2006.01)

(52) U.S. Cl.
CPC ............... *G06F 2221/2103* (2013.01); *G06F 2221/2133* (2013.01)

(58) Field of Classification Search
USPC .......................................................... 726/4
See application file for complete search history.

(56) References Cited

U.S. PATENT DOCUMENTS

| | | | | |
|---|---|---|---|---|
| 8,151,343 B1* | 4/2012 | Wang | ...................... | G06F 21/36 726/19 |
| 8,590,058 B2* | 11/2013 | Fisk | ...................... | G06F 21/31 726/22 |
| 8,667,566 B2* | 3/2014 | Lazar | ...................... | G06F 21/31 726/21 |
| 9,166,974 B2* | 10/2015 | Shuster | ...................... | G06F 21/36 |
| 9,519,766 B1* | 12/2016 | Bhosale | ...................... | G06F 21/32 |
| 9,558,337 B2* | 1/2017 | Gross | ...................... | G10L 15/22 |
| 9,767,263 B1* | 9/2017 | McInerny | ...................... | G06F 21/31 |
| 2003/0114224 A1* | 6/2003 | Anttila | ...................... | A63F 13/35 463/40 |
| 2005/0208458 A1* | 9/2005 | Smith | ...................... | G09B 7/063 434/128 |
| 2007/0052169 A1* | 3/2007 | Shanks | ...................... | A63F 3/04 273/236 |
| 2008/0104065 A1* | 5/2008 | Agarwal | ...................... | G06Q 10/10 |
| 2008/0127302 A1* | 5/2008 | Qvarfordt | ...................... | G06F 21/36 726/2 |
| 2009/0055193 A1* | 2/2009 | Maislos | ...................... | G06F 21/32 704/273 |
| 2009/0119234 A1* | 5/2009 | Pinckney | ...................... | G06N 20/00 706/12 |
| 2009/0288150 A1* | 11/2009 | Toomim | ...................... | G06F 21/6218 726/5 |
| 2010/0095350 A1* | 4/2010 | Lazar | ...................... | G06F 21/36 726/3 |
| 2010/0250497 A1* | 9/2010 | Redlich | ...................... | H04L 63/0227 707/661 |
| 2011/0209076 A1* | 8/2011 | Saxena | ...................... | G06F 21/36 715/764 |
| 2011/0302117 A1* | 12/2011 | Pinckney | ...................... | G06N 20/00 706/12 |
| 2012/0084450 A1* | 4/2012 | Nagamati | ...................... | G06F 21/31 709/229 |
| 2012/0090028 A1* | 4/2012 | Lapsley | ...................... | H04L 63/08 726/22 |
| 2013/0276125 A1* | 10/2013 | Bailey | ...................... | G06F 21/46 726/25 |
| 2013/0344468 A1* | 12/2013 | Lindsay | ...................... | G06Q 30/0201 434/322 |
| 2014/0059663 A1* | 2/2014 | Rajshekar | ...................... | H04L 63/08 726/6 |
| 2014/0101739 A1* | 4/2014 | Li | ...................... | G06F 21/30 726/7 |
| 2014/0307876 A1* | 10/2014 | Agiomyrgiannakis | ...................... | G10L 21/003 381/17 |
| 2014/0379456 A1* | 12/2014 | Miller | ...................... | G06Q 30/0242 705/14.41 |
| 2015/0271166 A1* | 9/2015 | Paxton | ...................... | G06F 21/316 726/2 |
| 2017/0078319 A1* | 3/2017 | Thompson | ...................... | H04L 63/1433 |
| 2017/0161477 A1* | 6/2017 | Liu | ...................... | G06N 7/005 |
| 2017/0300676 A1* | 10/2017 | Hou | ...................... | G06F 21/31 |
| 2017/0352379 A1* | 12/2017 | Oh | ...................... | G11B 27/11 |
| 2018/0081968 A1* | 3/2018 | Aryan | ...................... | G06N 7/005 |
| 2018/0129978 A1* | 5/2018 | Vigoda | ...................... | G06N 5/046 |

FOREIGN PATENT DOCUMENTS

| | | | | |
|---|---|---|---|---|
| WO | WO 2014/058810 A1 | 4/2014 | | |
| WO | WO-2014058810 A1 * | 4/2014 | ............ | G06F 21/30 |

OTHER PUBLICATIONS

Aggarwal, Suhas. "Animated CAPTCHAs and games for advertising." In Proceedings of the 22nd International Conference on World Wide Web, pp. 1167-1174. 2013. (Year: 2013).*

Xu, Yi, Gerardo Reynaga, Sonia Chiasson, Jan-Michael Frahm, Fabian Monrose, and Paul C. Van Oorschot. "Security analysis and related usability of motion-based captchas: Decoding codewords in motion." IEEE transactions on dependable and secure computing 11, No. 5 (2013): 480-493. (Year: 2013).*

Mehra, M., Mayank Agarwal, R. Pawar, and D. Shah. "Mitigating denial of service attack using Captcha mechanism." In Proceedings of the International Conference & Workshop on Emerging Trends in Technology, pp. 284-287. 2011. (Year: 2011).*

James, Divya, and Mintu Philip. "A novel anti phishing framework based on visual cryptography." In 2012 International conference on power, signals, controls and computation, pp. 1-5. IEEE, 2012. (Year: 2012).*

* cited by examiner

SYSTEMS AND METHODS FOR INCLUSIVE CAPTCHA

PRIORITY CLAIM

This U.S. patent application claims priority under 35 U.S.C. § 119 to: Indian Patent Application No. 201721025362, filed on 17 Jul. 2017. The entire contents of the aforementioned application are incorporated herein by reference.

TECHNICAL FIELD

The embodiments herein generally relate to data processing and information security, and more particularly to systems and methods for inclusive CAPTCHA that addresses users of all abilities and particularly optimizes tradeoff between security and accessibility.

BACKGROUND

Completely Automated Public Turing Tests to Tell Computers and Humans Apart (CAPTCHA) is a computer program or system intended to distinguish human from machine input as a security measure. The purpose of the CAPTCHA is to protect web applications like website registrations, online polls, etc. from malicious programs (bots), dictionary attacks and web crawlers. Users are given a challenge to solve which is understandable by humans. Based on the response given, the system determines whether the user is human or not. CAPTCHAs are classified based on the type of content that is distorted. Some types of CAPTCHA are CAPTCHA based on text, CAPTCHA based on image, CAPTCHA based on audio and CAPTCHA based on puzzle. The state of art CAPTCHA imperatively involves a tradeoff between goals of security and accessibility. It has been observed that in order to provide accessible CAPTCHA for users with disabilities, protected applications may need to be compromised on security aspects. Since CAPTCHA is primarily targeted at information security, it is a challenge to manage security while ensuring usability and accessibility for users of all abilities.

SUMMARY

Embodiments of the present disclosure present technological improvements as solutions to one or more of the above-mentioned technical problems recognized by the inventors in conventional systems.

In an aspect, there is provided a processor implemented method for inclusive CAPTCHA comprising: in response to a user request for a webpage having CAPTCHA, creating a media file in real-time, wherein the created media file is characterized by distortion interference and corresponds to a selected theme from a plurality of themes associated with real-world scenarios; randomly selecting a comprehension question based on the created media file as the CAPTCHA, the comprehension question being based on the selected theme, geography associated with a user requesting the webpage and context of the created media file; and transmitting the webpage including the CAPTCHA. Again in response to a user input to the comprehension question, the method intelligently detects either a human input or a machine input based on a self-learning CAPTCHA decision module.

In another aspect, there is provided a system comprising: one or more hardware processors and one or more data storage devices (102) operatively coupled to the one or more processors for storing instructions configured for execution by the one or more processors, the instructions being comprised in: a CAPTCHA generating module configured to, in response to a user request for a webpage having CAPTCHA, create a media file in real-time, wherein the created media file is characterized by distortion interference and corresponds to a selected theme from a plurality of themes associated with real-world scenarios; randomly select a comprehension question based on the created media file as the CAPTCHA, the comprehension question being based on the selected theme, geography associated with a user requesting the webpage and context of the created media file; and transmit the webpage including the CAPTCHA. The instructions are further comprised in a self-learning CAPTCHA decision module configured to, in response to a user input to the comprehension question, intelligently detect either a human input or a machine input.

In yet another aspect, there is provided a computer program product comprising a non-transitory computer readable medium having a computer readable program embodied therein, wherein the computer readable program, when executed on a computing device, causes the computing device to: in response to a user request for a webpage having CAPTCHA, create a media file in real-time, wherein the created media file is characterized by distortion interference and corresponds to a selected theme from a plurality of themes associated with real-world scenarios; randomly select a comprehension question based on the created media file as the CAPTCHA, the comprehension question being based on the selected theme, geography associated with a user requesting the webpage and context of the created media file; and transmit the webpage including the CAPTCHA. Again in response to a user input to the comprehension question, the computing device intelligently detects either a human input or a machine input based on a self-learning CAPTCHA decision module.

In an embodiment of the present disclosure, the created media file is at least one of an aural form or a visual form.

In an embodiment of the present disclosure, the created media file is a combination of two or more media files of the same form but varying type or a combination of two or more media files of different forms, each combination corresponding to the selected theme.

In an embodiment of the present disclosure, the varying types of the two or more media files are associated with an environment and contextual information thereof.

In an embodiment of the present disclosure, the CAPTCHA generating module is further configured to, in response to a user input to the comprehension question, select and transmit at least one alternative comprehension question for the selected theme.

In an embodiment of the present disclosure, each comprehension question is associated with a plurality of solutions corresponding to the created media file for the selected theme.

In an embodiment of the present disclosure, the CAPTCHA generating module is further configured to present the selected comprehension question in at least one of visual or aural form.

In an embodiment of the present disclosure, the self-learning CAPTCHA decision module is configured to intelligently detect either a human input or a machine input by: intelligently comparing the user input to previously stored user inputs from a decision repository of the self-learning CAPTCHA decision module, considering one or more of spelling errors, incomplete responses, contextual metonyms, synonyms and variants thereof; detecting either a human input or a machine input based on the comparing and associated decision thereof; and updating the decision repository with the user input and associated decision based on the detected input.

It is to be understood that both the foregoing general description and the following detailed description are exemplary and explanatory only and are not restrictive of the embodiments of the present disclosure, as claimed.

BRIEF DESCRIPTION OF THE DRAWINGS

The embodiments herein will be better understood from the following detailed description with reference to the drawings, in which.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Before setting forth the detailed explanation, it is noted that all of the discussion below, regardless of the particular implementation being described, is exemplary in nature, rather than limiting.

Completely Automated Public Turing Tests to Tell Computers and Humans Apart (CAPTCHA) is a challenge-response test which determines whether the user is a human or not. There are different types of CAPTCHA based on distortion introduced.

1) CAPTCHA based on text: A textual challenge based on reading text or other visual/aural perception tasks are presented to users. For example, Flower, resting, lawyer and campsite: the word starting with "c" is?

What is 1+six?

Which of sock, library, cake or red is a color?

The word in capitals from relieves, luxuriate or CAMPAIGN is?

CAPTCHA based on text which have mostly arithmetic, logical or general knowledge based questions can be easily solved by computing engines, creating a security issue. These CAPTCHA are also arduous for cognitively-disabled users to solve.

2) CAPTCHA based on image: Image having combinations of distorted characters and obfuscation techniques or images of real-world objects like animals, people or landscapes are presented to users which they have to identify or read and retype. They are based on reading text or other visual-perception tasks. For example, An image having 12 pets may be presented and user maybe asked to identify all images of cats.

User may be presented a picture divided into chunks and user has to combine or swap them to form a complete picture like a jigsaw puzzle.

CAPTCHA based on visual perception are inaccessible to visually impaired users as they are designed to be unreadable by machines; common assistive technology tools such as screen readers also cannot interpret them. Sometimes these CAPTCHA have distorted text and images in such a way that it gets difficult for main stream users and low vision users as well to read, thus hampering usability. Also image based CAPTCHA which are in the form of puzzles operations like drag and drop, flipping of images, pointing with mouse may be difficult to perform for keyboard only users. They may also be a challenge for cognitively-disabled users.

3) CAPTCHA based on audio: Audio CAPTCHA was developed particularly for visually impaired users based on sound based systems. Users are generally required to listen to an audio and type into a textbox. They are based on aural-perception tasks. As per research literature, humans find audio CAPTCHA difficult to solve because of distortion interference present. Misinterpretation of letters like T and D, B and P which sound similar when distorted is common. Also, these audios may be easily decoded by current automated speech recognition (ASR) techniques raising a security concern. Audio CAPTCHA also face localization issues as the content in the audios may not be understandable to every user. Audio playback is linear. User relying on screen reader may have a challenge in understanding the difference between voice of the screen reader and the audio.

It may be noted from the state of art CAPTCHA that successful implementation of CAPTCHA that is accessible, secure and simultaneously usable is a challenge. Visually impaired, low vision users find image based CAPTCHA challenging as they are unable to visually perceive it thus making it inaccessible and un-usable. Security aspect of image based CAPTCHA may also be negotiated and broken with machine learning techniques unless accessibility is compromised. Audio CAPTCHA may cater to visually challenged users but may be difficult to solve and time consuming and have a low success rate as seen in research literature, thus further degrading usability and effecting accessibility. Also state of art audio CAPTCHA may be been broken by high-quality Automatic Speech Recognition (ASR) and noise removal systems. The present disclosure addresses particularly the tradeoff between accessibility and security seen in state of the art CAPTCHA and accordingly, the methods and systems of the present disclosure aim to provide an inclusive CAPTCHA that meets the orthogonal requirements of usability, accessibility and security while addressing users of all needs and hence being inclusive.

Referring now to the drawings, and more particularly to FIGS. 1 through 9, where similar reference characters denote corresponding features consistently throughout the figures, there are shown preferred embodiments and these embodiments are described in the context of the following exemplary system and method.

Figure 1:
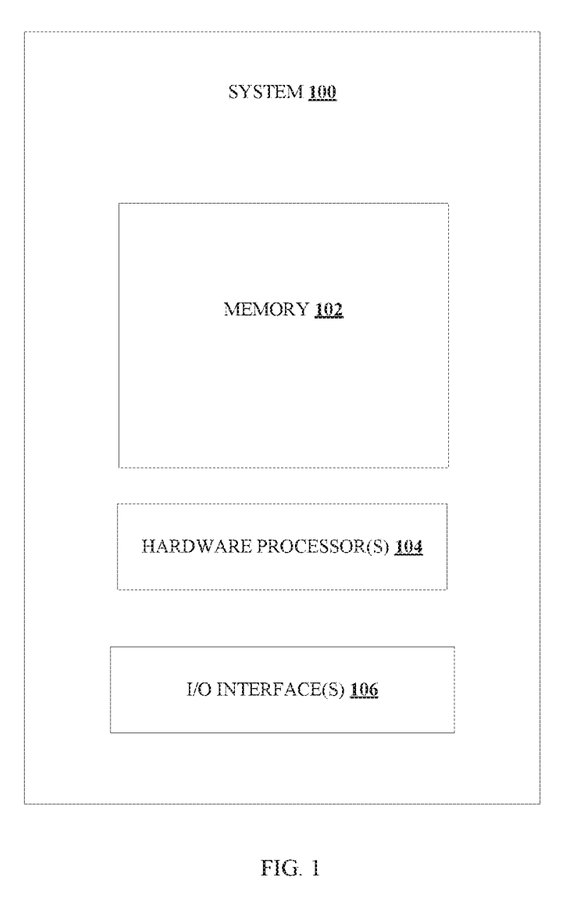
FIG. 1 illustrates an exemplary block diagram of a system for providing inclusive CAPTCHA, in accordance with an embodiment of the present disclosure.

FIG. 1 illustrates an exemplary block diagram of a system 100 for providing inclusive CAPTCHA, in accordance with an embodiment of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102.

Figure 2:
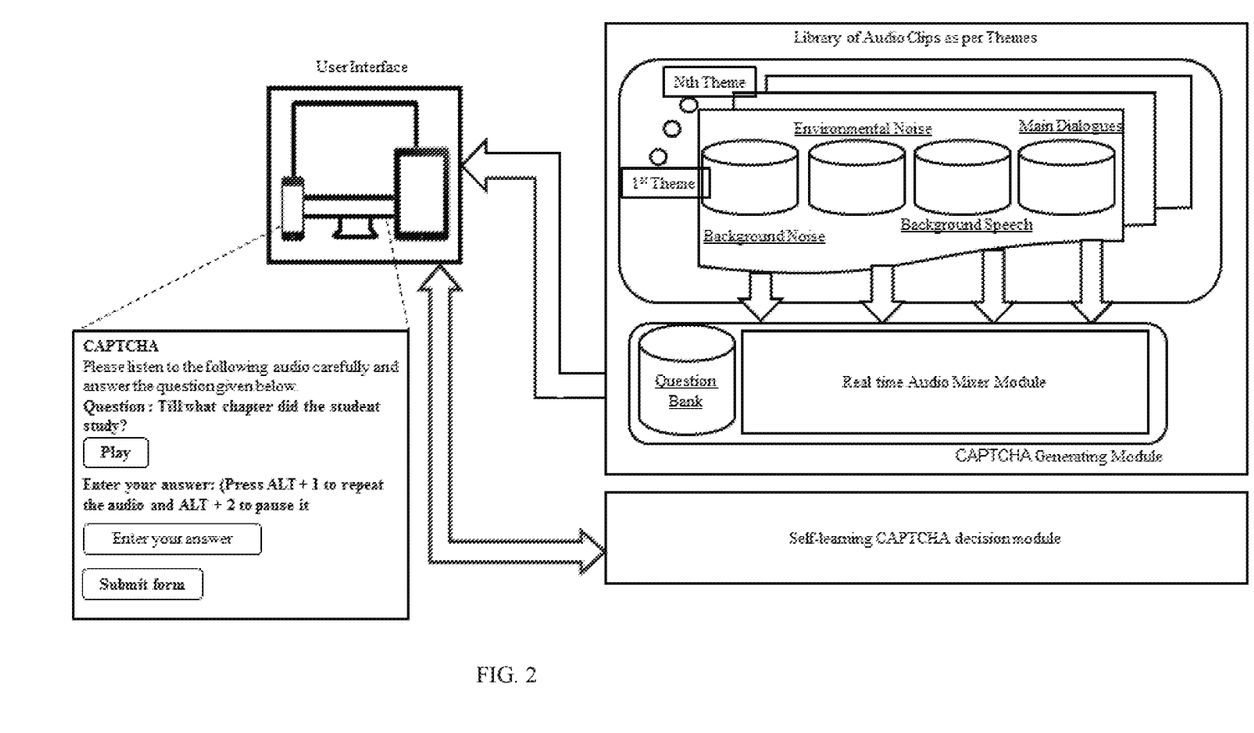
FIG. 2 illustrates an exemplary architectural diagram of the system for providing inclusive CAPTCHA, in accordance with an embodiment of the present disclosure.
Figure 3:
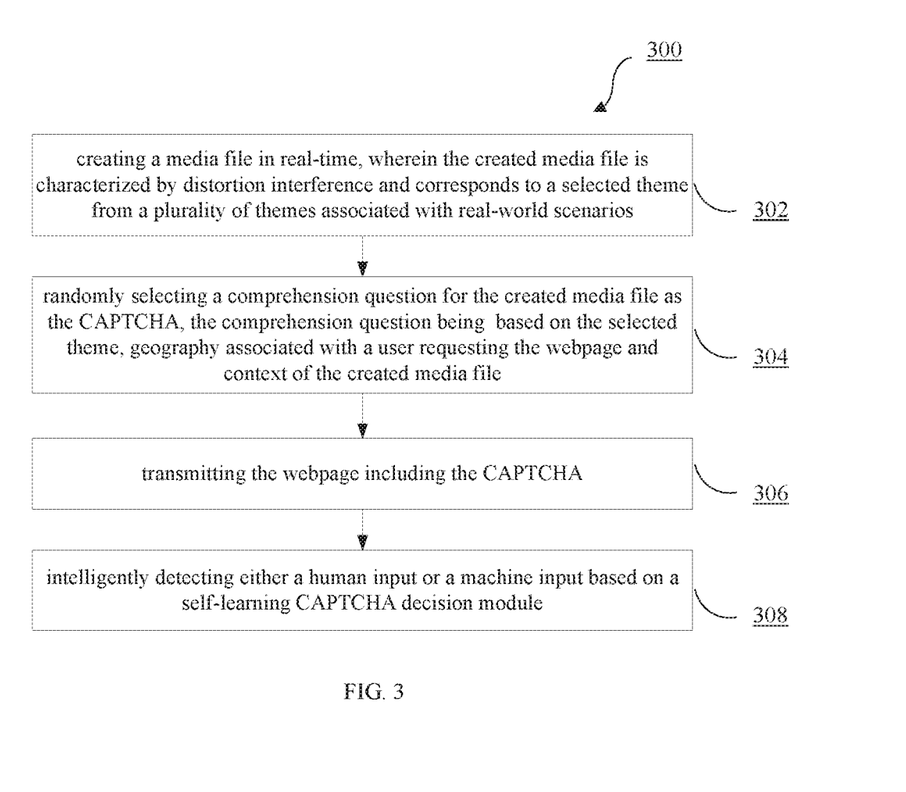
FIG. 3 is an exemplary flow diagram illustrating a computer implemented method for inclusive CAPTCHA, in accordance with an embodiment of the present disclosure.

FIG. 2 illustrates an exemplary architectural diagram of the system for providing inclusive CAPTCHA, in accordance with an embodiment of the present disclosure. The inclusive CAPTCHA of the present disclosure considers the orthogonal requirements of usability, security and accessibility for users with disabilities (visual, hear, motor, disability) and also main stream users to make the CAPTCHA practically inclusive. FIG. 3 is an exemplary flow diagram illustrating a computer implemented method 200 for inclusive CAPTCHA, in accordance with an embodiment of the present disclosure. In an embodiment, the system 100 comprises one or more data storage devices or memory 102 operatively coupled to the one or more processors 104 and is configured to store instructions configured for execution of steps of the method 200 by the one or more processors 104.

The steps of the method 200 will now be explained in detail with reference to the components of the system 100 based on the architectural diagram of FIG. 2. In an embodiment, the system 100 may comprise exemplary modules such a CAPTCHA generation module (not particularly illustrated). and a self-learning CAPTCHA decision module (not particularly illustrated). In an embodiment, the CAPTCHA generating module is configured to create in real-time, a media file, at step 202, in response to a user request for a webpage having CAPTCHA, wherein the created media file is characterized by distortion interference. In the context of the present disclosure, distortion interference involves overlap of media files. In accordance with the present disclosure, the created file may have an aural form, a visual form or a combination of both, such as audio-visual form, wherein the visual form may include videos or animations. However, for ease of explanation, certain exemplary embodiments may be explained with reference to audio files that may not be construed as limiting the scope and/or the applicability of the appended claims. In another embodiment, the created media file is a combination of two or more media files that are of the same form or of different forms. Again, when the two or more media files are of the same form, they may be of varying type. In accordance with the present disclosure, there may be a plurality of themes associated with real-world scenarios. For instance, the created media file may be an audio file exemplifying conversation in a school, traffic, railway station, zoo, park, and the like. The created media file corresponds to a selected theme from the plurality of themes. Each of the mentioned themes such as school, railway station, zoo, and the like may be associated with a library of media files. Again, in an embodiment, the varying types of the two or more media files are associated with an environment and associated contextual information. For instance, in case of the created media file being an audio file, each theme may be associated with a library of audio files wherein each library may comprise further sub-libraries of audio files pertaining to main dialogues, environmental noise, background noise and background speech in line with the theme of the environment which may be combined in real-time and presented to the user as a created media file. The level of possible combinations for each theme and the possible variants along with the distortion interference or overlap of the media files, for instance the described four types of audio files to create the media file enables addressing the security aspect.

Figure 4:
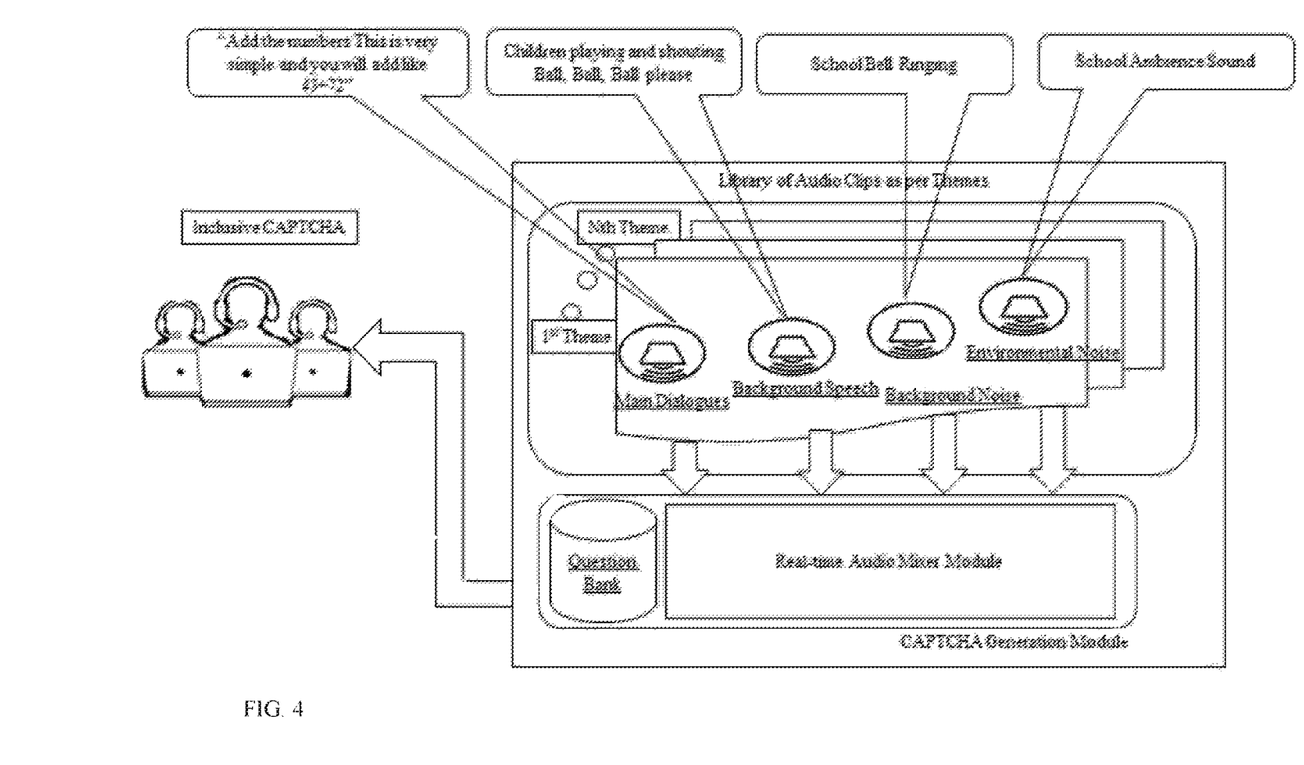
FIG. 4 illustrates a working flow diagram of the method for inclusive CAPTCHA, in accordance with an embodiment of the present disclosure.

In an embodiment, the CAPTCHA generating module is configured to select a comprehension question randomly, at step 204, for the created media file as the CAPTCHA. In an embodiment, a question bank may comprise all possible comprehension questions related to each theme. In an embodiment, the selected comprehension question is based on the selected theme, geography associated with a user requesting the webpage and context of the created media file; wherein geography associated with a user also pertains to the corresponding culture and language. FIG. 4 illustrates a working flow diagram of the method for inclusive CAPTCHA, in accordance with an embodiment of the present disclosure. The CAPTCHA generating module first randomly selects a theme (a school in the illustration of FIG. 4). In the exemplary embodiment as illustrated in FIG. 4, the created media file is an audio file that is a combination in real-time of four types of audio files viz., main dialogues, background noise, environmental noise and background speech. This technique of combining media files (for instance, audio files, by say a real-time audio mixer module) makes it difficult for an ASR engine to interpret the CAPTCHA question. The dialogue in the created audio file may be in single language or multiple languages, grammatically correct/incorrect to make it tough for ASRs to break. As the created audio file presented to the user is a real-world scenario which a human experiences in day-to day life like the school in FIG. 4, processing, extracting and interpreting information would require minimal mental effort. Also, the fact that the theme relates to a real-world scenario and the selected question is based on the context of the created media file facilitates accessibility for users of all abilities. Again, the created media (audio in the exemplary embodiment) file may also be customized considering the geography, culture and language of the user. As seen in FIG. 4, a comprehension question presented to the user is "What is the teacher teaching". The question asked in the CAPTCHA is purely based on the context of the school theme and the created audio file, thereby reducing cognitive load on the user.

It may be noted that merging multiple media files makes it difficult for automated scripts to recognize audio or images and extract information accurately to respond to the CAPTCHA; whereas, being context related and associated with real-world scenarios, the CAPTCHA is easy for a human to comprehend.

In an embodiment, the CAPTCHA generating module is configured to transmit the webpage including the CAPTCHA, at step 206. In an embodiment, the selected comprehension question may be presented in a visual form, an aural form or a combination thereof such as audio-visual form.

In an embodiment, the self-learning CAPTCHA decision module is configured to, at step 208, in response to a user input to the comprehension question, intelligently detect either a human input or a machine input.

In an embodiment, in response to the user input to the comprehension question, the CAPTCHA generating module may select and transmit at least one alternative comprehension question for the selected theme. For instance, if the self-learning CAPTCHA decision module is unable to make a decision based on the user input to the comprehension question, the CAPTCHA generating module may present an alternative comprehension question for the selected theme.

Once the user answers the comprehensive question presented the self-learning CAPTCHA decision module determines its correctness and decides whether the access is made by a human or a machine. In an embodiment, the self-learning CAPTCHA decision module is configured to detect either a human input or a machine input by firstly intelligently comparing the user input to previously stored user inputs from a decision repository of the self-learning CAPTCHA decision module. The CAPTCHA decision module may use information retrieval technology strategies to compare the user input by the user with stored user inputs by considering one or more of spelling errors, incomplete responses, contextual metonyms, synonyms and variants thereof. For instance, if a response to a comprehension question is "tea", possible acceptable responses include "chai (Hindi language synonym), tea (actual answer), chaha (Marathi language synonym), tee (incorrect spelling), hot drink (metonym), cha (incomplete response)". This feature of the present disclosure ensures accessibility particularly to dyslexic users and users with learning disabilities. The step of detecting either a human input or a machine input is based on the comparing and associated decision thereof. In a self-learning manner, each user input and associated decision based on the detected input by the self-learning CAPTCHA decision module is dynamically updated in the decision repository to build a knowledge base that may be continually updated for improved decision accuracy.

In the exemplary example of FIG. 4, an acceptable user response for the question asked may be "math/mathematics/sum/plus/add/addition" which only a human can interpret and answer. In another instance, if the same theme (school) is selected, the question asked may remain same ("What is teacher teaching") but if the main dialogue audio file selected by the CAPTCHA generating module was modified wherein the teacher was teaching English, the accepted answers may change to "english/angrezi/british/foreign". Thus, in an embodiment, each comprehension question may be associated with a plurality of solutions corresponding to the created media file for the selected theme making it more complicated for ASR and machine learning engines to crack the CAPTCHA.

In another exemplary example, there may be four types of audio files:
Background noise: traffic sound, car honk 2 times, car driving sound
Background speech: beggar sound, a person selling newspaper in the traffic
Environment noise: A person in a car which is moving traffic is having a conversation on the phone.
Main dialogues: Hi Srikanth. What's the time there? It is 10 o'clock in the morning in India.
Comprehension questions and acceptable user inputs may be:
To whom was the person asking time? Srikanth/male/Srikant
What is the time in India as specified in the audio? 10 am/10 o'clock/dus
How many times did the car in the background honk? 2 times/twice/do/2/two
Which country is being referred in the audio? India/Bharat
Which part of the day is 10 o'clock—Morning In accordance with the present disclosure, usability with regards to the inclusive CAPTCHA may be further enhanced by enabling replay of the created media file. User interface (UI) may be further enhanced by enabling the user to listen and type at the same time using screen reader and providing keyboard accessibility. As the user clicks on 'play', the focus may automatically set on a text input field to enable the user to type as soon as the audio is heard. In an embodiment, a shortcut key may be implemented to replay the audio for the user while the focus remains on the text field, thus reducing the number of interaction clicks needed by the user to complete the CAPTCHA.

Evaluation study conducted on an exemplary embodiment of the present disclosure with audio files:
Procedure: A user study and security testing was conducted to evaluate the usability, accessibility and security of the inclusive CAPTCHA. A total of 119 participants took part in the user study where 24 participants were screen reader users (partially blind or completely blind) and 95 were non-disabled (main stream) users recruited by crowd sourcing. There was no restriction on the type of screen reader software used by the screen reader users and all the users were asked to use their own devices. The users were given a brief introduction about CAPTCHA and were required to fill a web-form which had the inclusive CAPTCHA incorporated in it. Through the web-form, the users were asked information like name, age, electronic mail, whether visually impaired. From a set of 10 audios files, a single audio file was selected at random and presented to the user. To take the edge of usability issue, the user was asked to fill a feedback questionnaire consisting of three questions where the users were asked to rate the inclusive CAPTCHA of the present disclosure between 1 and 5 where 1 is the least and 5 is the highest rating.

Security Analysis: CAPTCHA is a mechanism adopted by several portals to protect their web applications from malicious programs such as bots. Powerful robots backed by machine learning algorithms have the capability to break the existing audio CAPTCHAs. However, the inclusive CAPTCHA of the present disclosure consists of a media file such as an audio file in the exemplary of FIG. 4 which is a combination of multiple orthogonal speech conversations and different sounds. The inclusive CAPTCHA consisted of human spoken dialogues superimposed with background noise in form of human voices and environment noise relevant to the theme. These created audio CAPTCHA were not decodable by a tested state of the art general purpose Automatic Speech Recognition engine (Speech to text convertor). Table 1 below shows some of the transcripts obtained from the ASR.

TABLE 2

Comparison of ASR engine and actual audio file transcripts

| Theme and audio file | Transcripts obtained from ASR | Actual scripts of the audio file |
|---|---|---|
| Temple Environment: audio_1 | He couldn't refrain greenness | Where are you going, Kiran? I am going to the Temple, John. |
| Phone Conversation in Busy Street: audio_2 | null | Hi Tina, What's the time there? It's 10'o clock morning in India |
| School Environment: audio_3 | added on the line Newton anything but how do you live like Florida yeah family jewels | Add the numbers and you will add like 43 plus 72 |
| Train Station Environment: audio_4 | null | 78861 from Delhi to Raipur is arriving on platform number 6 |
| Zoo Environment: audio_5 | null | Mummy, see the white elephant |
| Lift Environment: Audio_6 | can you clarify for legal shelf | 7th floor. Can u press the 4th floor? Sure. 4th Floor. Going up. |
| Grocery Store Environment: audio_7 | Export gate by he how can it be quantify it first people please on my face | What's the price of onions? Its 45 per kg. How can it be 45, it was 30 on Monday |
| Hotel Reception Environment: audio_8 | null | Here's your key. Your room number is 324. If you need anything, please dial 0 for the reception area. |

The results clearly indicate that the transcripts obtained from ASR were not at all close to the actual scripts of the audio, thereby proving the inclusive CAPTCHA of the present disclosure is strong and difficult for a machine to decode.

Figure 5:
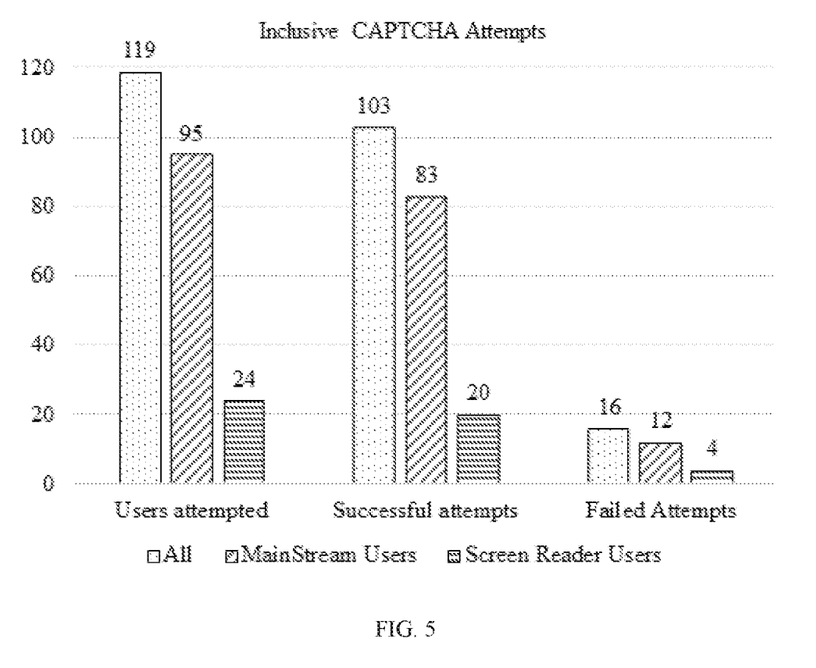
FIG. 5 illustrates a graphical representation of users with different abilities and number of successful and failed attempts using the inclusive CAPTCHA in accordance with an embodiment of the present disclosure.
Figure 6:
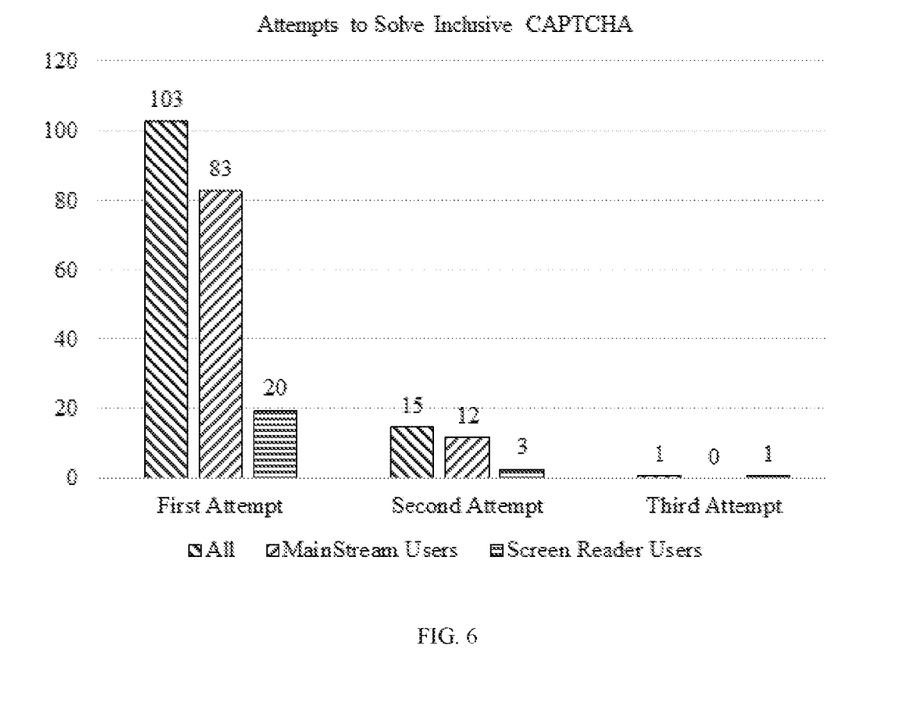
FIG. 6 illustrates a graphical representation of users with different abilities and number of attempts made to successfully complete the inclusive CAPTCHA in accordance with an embodiment of the present disclosure.

Quantitative analysis: The inclusive CAPTCHA audio of the present disclosure has an average play time of 11 seconds. The usability and accessibility of the CAPTCHA was measured on the following metrics:
Time to complete one entire challenge (completion time)
Thinking time of the user (the time duration between the audio completion and before the user types his response)
Number of times the user heard the audio to solve the CAPTCHA User Performance Analysis: With the assumption that a user is able to solve the CAPTCHA in first attempt it is recorded as a successful attempt. FIG. 5 illustrates a graphical representation of users with different abilities and number of successful and failed attempts using the inclusive CAPTCHA in accordance with an embodiment of the present disclosure. Of 86% (103 out of 119) successful attempts by all users, 84% (20 out of 24) of the users using screen reader and 88% of the non-disabled (main stream) users were able to complete the challenge in the first attempt; however all the users were able to complete the task (success rate is 100% as shown in FIG. 6 wherein a graphical representation of users with different abilities and number of attempts made to successfully complete the inclusive CAPTCHA in accordance with an embodiment of the present disclosure is illustrated.

The failed attempts in the FIG. 5 represent the number of users who failed to solve the CAPTCHA in the first attempt. However they were able to complete the CAPTCHA task after two or more attempts as shown in FIG. 6. As observed, there was no user who required a third attempt in the mainstream category while only one user in screen reader category needed a third attempt.

Response time analysis: Table 2 below shows a statistical measure for average response time taken to solve the CAPTCHA in the user study by all, mainstream and screen reader users.

TABLE 2

Time Response comparison for inclusive CAPTCHA

| | All users | Mainstream users | Screen reader users |
|---|---|---|---|
| Avg. response time | 31 seconds | 30 seconds | 38 seconds |
| Minimum time | 8 seconds | 8 seconds | 14 seconds |
| Maximum time | 142 seconds | 130 seconds | 142 seconds |

Figure 7:
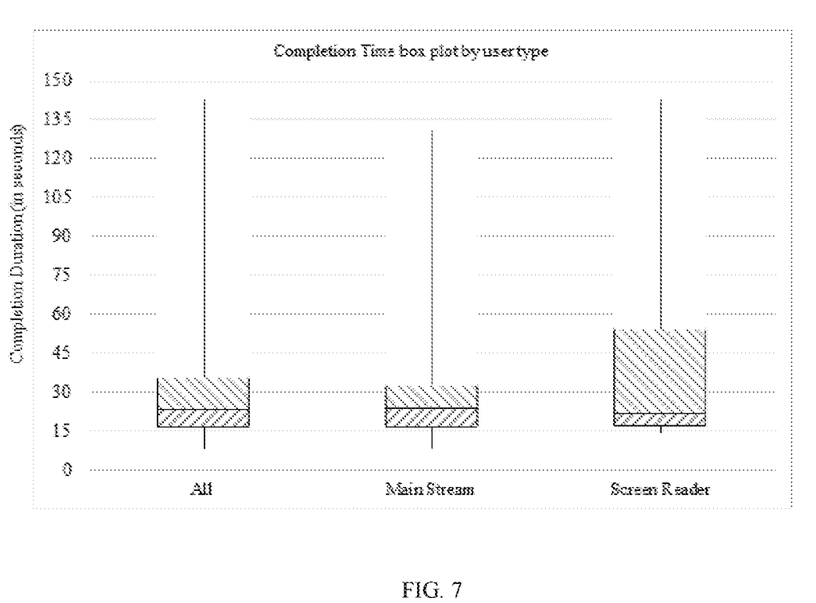
FIG. 7 illustrates a graphical representation of users with different abilities and time taken to complete the inclusive CAPTCHA in accordance with an embodiment of the present disclosure.

To understand the overall distribution and variation for the response time of all the participants part of user study a box plot was included for measurement in addition to the average response time. FIG. 7 illustrates a graphical representation, in the form of a box plot of users with different abilities and time taken to complete the inclusive CAPTCHA in accordance with an embodiment of the present disclosure. The plot clearly shows no significant difference in the completion time scores of the lower and upper quartile range for all and mainstream users however more number of screen reader users fall in the upper quartile range. Summarizing, screen reader users took more time to respond to the CAPTCHA (FIG. 7) but 84% of the users got it right in the first attempt (with no background about the inclusive CAPTCHA) also the response time improves when used multiple times. The average time to complete the inclusive CAPTCHA test is 30 seconds with minimum of 8 seconds for main stream users and 38 seconds with minimum of 14 seconds for the screen reader users which is less than 65.64 seconds, the average time to complete a ReCAPTCHA test as known in the art, thus making it more usable.

Figure 8:
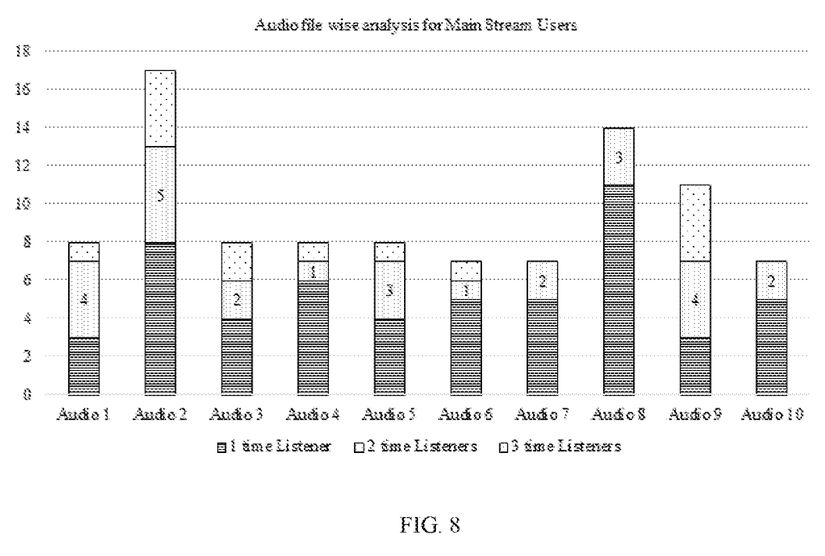
FIG. 8 illustrates a graphical representation of audio file wise analysis for main stream users of the inclusive CAPTCHA in accordance with an embodiment of the present disclosure.
Figure 9:
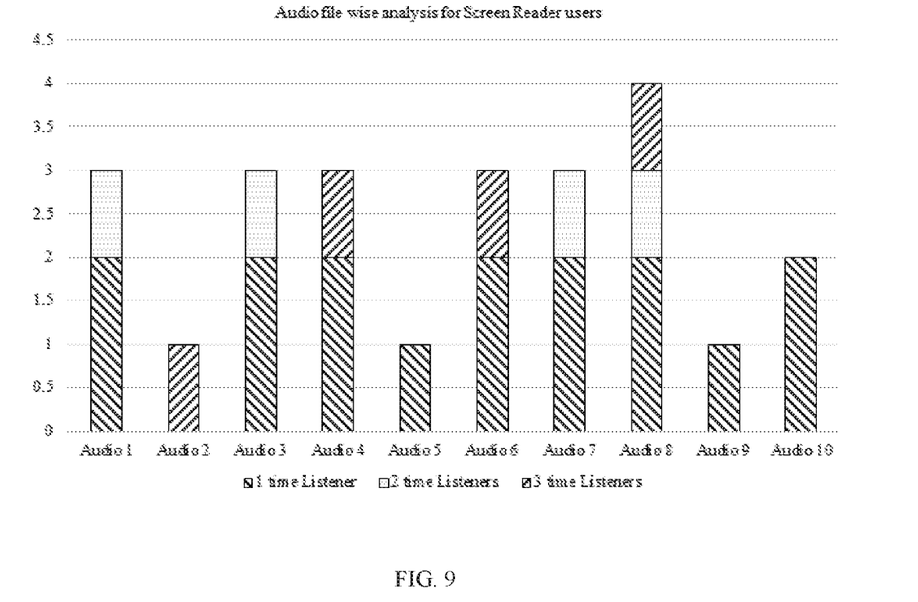
FIG. 9 illustrates a graphical representation of audio file wise analysis for screen reader users of the inclusive CAPTCHA in accordance with an embodiment of the present disclosure.

Audio file-wise analysis: FIG. 8 illustrates a graphical representation of audio file wise analysis for main stream users of the inclusive CAPTCHA in accordance with an embodiment of the present disclosure. As observed, more than 85% of the mainstream users have played the audio for one time or two times. In the FIG. 8, Audio 8 has the highest number of users listening to the audio file one time. This clearly is indicative of how clear the audio sounds were to a human. FIG. 9 illustrates a graphical representation of audio file wise analysis for screen reader users of the inclusive CAPTCHA in accordance with an embodiment of the present disclosure. As observed, more than 83% of the screen reader users have played the audio for one time or two times. This clearly is indicative of how clear the audio sounds were to a screen reader user. Table 3 below present the results comparing the inclusive CAPTCHA with the standard image CAPTCHA.

TABLE 3

Comparing inclusive CAPTCHA and image CAPTCHA between mainstream users.

|  | Inclusive CAPTCHA | Image CAPTCHA |
| --- | --- | --- |
| Average time taken to complete the CAPTCHA challenge | 33 seconds | 22 seconds |
| Minimum time | 8 seconds | 1.62 seconds |
| Maximum time | 130 seconds | 39 seconds |
| Average typing time | 6 seconds | 8 seconds |
| Minimum | 1.43 seconds | 3 seconds |
| Maximum | 31 seconds | 22 seconds |

The average time taken to complete the inclusive CAPTCHA of the present disclosure is on higher side however it was observed that average typing time taken for inclusive CAPTCHA is less than that of Image CAPTCHA because the user had read the questions, listened to the audio file and answered the question based on the audio file thus reducing the cognitive load of thinking of an answer to solve the CAPTCHA.

Qualitative Analysis: At the end, a feedback questionnaire of 3 questions was asked and the users were supposed to rate between 1 and 5 where 1 is the least and 5 is the highest rating. Table 4 below summarizes the average score of the each question given by the users depicting a positive feedback about the overall experience in solving the inclusive CAPTCHA.

TABLE 4

Average score for the feedback questions asked.

|  | Inclusive CAPTCHA | Image CAPTCHA |
| --- | --- | --- |
| How easy was it to use the inclusive CAPTCHA? | 4.31 | 4.62 |
| How easy is it to understand the content in the audio file? | 4.13 | 4.48 |
| How easy was it to solve the CAPTCHA challenge? | 4.27 | 4.62 |

Thus in accordance with the present disclosure, systems and methods described herein above provide an inclusive CAPTCHA based on real-world scenarios that users could relate to in day to day life thereby decreasing the cognitive load. Results of security test shows it was difficult to crack and decode by automated engines known in the art. Accessibility and usability tests showed positive responses, easy to use and had a task success rate of 100% and 83% of the screen reader users participated were successful in the first attempt without any initial training of the inclusive CAPTCHA of the present disclosure. Screen Reader users were able to complete the task with an average time of 38 seconds with minimum of 14 seconds which is less as compared to previous studies thus making the inclusive CAPTCHA truly secure, accessible and usable for users of all abilities.

The written description describes the subject matter herein to enable any person skilled in the art to make and use the embodiments of the present disclosure. The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

The scope of the subject matter embodiments defined here may include other modifications that occur to those skilled in the art. Such other modifications are intended to be within the scope if they have similar elements that do not differ from the literal language of the claims or if they include equivalent elements with insubstantial differences from the literal language.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments of the present disclosure may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules comprising the system of the present disclosure and described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The various modules described herein may be implemented as software and/or hardware modules and may be stored in any type of non-transitory computer readable medium or other storage device. Some non-limiting examples of non-transitory computer-readable media include CDs, DVDs, BLU-RAY, flash memory, and hard disk drives.

Further, although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope and spirit of disclosed embodiments being indicated by the following claims.

What is claimed is:

1. A processor implemented method for inclusive Completely Automated Public Turing Tests to Tell Computers and Humans Apart (CAPTCHA), the method comprising:
   in response to a user request for a webpage having CAPTCHA,
   creating a media file in real-time, wherein the created media file is characterized by distortion interference and corresponds to a selected theme from a plurality of themes associated with real-world scenarios, and wherein the created media file is a combination of two or more media files in a overlapping manner;
   randomly selecting a comprehension question from a question bank for the created media file as the CAPTCHA, the comprehension question being based on the selected theme, geography, culture and language associated with a user requesting the webpage and context of the created media file, wherein the question bank comprises a plurality of comprehension questions for each theme, and wherein each comprehension question of the plurality of comprehension questions of the selected theme, is associated with a plurality of acceptable solutions corresponding to the context of the created media file; and
   transmitting the webpage including the CAPTCHA to the user; and
   in response to a user input to the comprehension question, intelligently detecting either a human input or a machine input based on a self-learning CAPTCHA decision module, wherein detecting either the human input or the machine input based on the self-learning CAPTCHA decision module comprises:
   comparing the user input to previously stored user inputs from a decision repository of the self-learning CAPTCHA decision module, considering spelling errors, incomplete responses, contextual metonyms, synonyms and variants thereof;
   dynamically updating the decision repository with the user input and associated decision based on the detected input; and
   building a knowledge base that is continually updated for improved decision accuracy.

2. The processor implemented method of claim 1, wherein the created media file is at least one of an aural form or a visual form.

3. The processor implemented method of claim 2, wherein the combined two or more media files are of the same form but varying type or of different forms, each combination corresponding to the selected theme.

4. The processor implemented method of claim 3, wherein the varying types of the two or more media files are associated with an environment and contextual information thereof.

5. The processor implemented method of claim 1, wherein the step of in response to a user input to the comprehension question further comprises selecting and transmitting at least one alternative comprehension question for the selected theme.

6. The processor implemented method of claim 1, wherein the step of transmitting the webpage including the CAPTCHA comprises presenting the selected comprehension question in at least one of visual or aural form.

7. A system for providing inclusive Completely Automated Public Turing Tests to Tell Computers and Humans Apart (CAPTCHA) comprising:
   one or more hardware processors; and
   one or more data storage devices operatively coupled to the one or more processors for storing instructions configured for execution by the one or more processors, the instructions being comprised in:
   a CAPTCHA generating module configured to, in response to a user request for a webpage having CAPTCHA,
   create a media file in real-time, wherein the created media file is characterized by distortion interference and corresponds to a selected theme from a plurality of themes associated with real-world scenarios, and wherein the created media file is a combination of two or more media files in a overlapping manner;
   randomly select a comprehension question from a question bank for the created media file as the CAPTCHA, the comprehension question being based on the selected theme, geography, culture and language associated with a user requesting the webpage and context of the created media file, wherein the question bank comprises a plurality of comprehension questions for each theme, and wherein each comprehension question of the plurality of comprehension questions of the selected theme, is associated with a plurality of acceptable solutions corresponding to the context of the created media file; and
   transmit the webpage including the CAPTCHA to the user; and a self-learning CAPTCHA decision module configured to, in response to a user input to the comprehension question,
intelligently detect either a human input or a machine input, wherein detecting either the human input or the machine input by the self-learning CAPTCHA decision module comprises:
comparing the user input to previously stored user inputs from a decision repository of the self-learning CAPTCHA decision module, considering spelling errors, incomplete responses, contextual metonyms, synonyms and variants thereof;
dynamically updating the decision repository with the user input and associated decision based on the detected input; and
building a knowledge base that is continually updated for improved decision accuracy.

8. The system of claim 7, wherein the created media file is at least one of an aural form or a visual form.

9. The system of claim 8, wherein the combined two or more media files are of the same form but varying type or of different forms, each combination corresponding to the selected theme.

10. The system of claim 9, wherein the varying types of the two or more media files are associated with an environment and contextual information thereof.

11. The system of claim 7, wherein the CAPTCHA generating module is further configured to, in response to a user input to the comprehension question, select and transmit at least one alternative comprehension question for the selected theme.

12. The system of claim 7, wherein the CAPTCHA generating module is further configured to present the selected comprehension question in at least one of visual or aural form.

13. A computer program product comprising a non-transitory computer readable medium having a computer readable program embodied therein, wherein the computer readable program, when executed on a computing device, causes the computing device to:

in response to a user request for a webpage having a Completely Automated Public Turing Tests to Tell Computers and Humans Apart (CAPTCHA),
create a media file in real-time, wherein the created media file is characterized by distortion interference and corresponds to a selected theme from a plurality of themes associated with real-world scenarios, and wherein the created media file is a combination of two or more media files in a overlapping manner;
randomly select a comprehension question from a question bank for the created media file as the CAPTCHA, the comprehension question being based on the selected theme, geography, culture and language associated with a user requesting the webpage and context of the created media file, wherein the question bank comprises a plurality of comprehension questions for each theme, and wherein each comprehension question of the plurality of comprehension questions of the selected theme, is associated with a plurality of acceptable solutions corresponding to the context of the created media file; and
transmit the webpage including the CAPTCHA to the user; and
in response to a user input to the comprehension question,
intelligently detect either a human input or a machine input using a self-learning CAPTCHA decision module, wherein detecting either the human input or the machine input by the self-learning CAPTCHA decision module comprises:
comparing the user input to previously stored user inputs from a decision repository of the self-learning CAPTCHA decision module, considering spelling errors, incomplete responses, contextual metonyms, synonyms and variants thereof;
dynamically updating the decision repository with the user input and associated decision based on the detected input; and
building a knowledge base that is continually updated for improved decision accuracy.

\* \* \* \* \*